(12) United States Patent
Mackintosh et al.

(10) Patent No.: US 9,059,486 B2
(45) Date of Patent: Jun. 16, 2015

(54) AUTOMATIC CRASH BATTERY DISCHARGE METHOD

(75) Inventors: Todd F. Mackintosh, Macomb, MI (US); Galen E. Ressler, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 898 days.

(21) Appl. No.: 13/285,372

(22) Filed: Oct. 31, 2011

(65) Prior Publication Data

US 2013/0106362 A1    May 2, 2013

(51) Int. Cl.
| | |
|---|---|
| *H02J 7/00* | (2006.01) |
| *H02J 7/14* | (2006.01) |
| *H01M 10/42* | (2006.01) |
| *H01M 10/44* | (2006.01) |
| *H01M 10/48* | (2006.01) |

(52) U.S. Cl.
CPC .......... *H01M 10/425* (2013.01); *H01M 10/441* (2013.01); *H01M 10/482* (2013.01); *H01M 2010/4271* (2013.01); *H01M 2200/00* (2013.01); *H01M 2220/20* (2013.01)

(58) Field of Classification Search
CPC ....................................................... H02J 7/0031
USPC ........................................................... 320/136
See application file for complete search history.

(56) References Cited

U.S. PATENT DOCUMENTS

| | | | | |
|---|---|---|---|---|
| 6,064,178 | A  * | 5/2000 | Miller | 320/117 |
| 8,186,471 | B2 * | 5/2012 | Ohno | 180/274 |
| 8,612,073 | B2 * | 12/2013 | Fuji et al. | 701/22 |

FOREIGN PATENT DOCUMENTS

JP          3858797 B2      9/2006

\* cited by examiner

*Primary Examiner* — Edward Tso
*Assistant Examiner* — Ahmed Omar
(74) *Attorney, Agent, or Firm* — John A. Miller; Miller IP Group, PLC

(57) ABSTRACT

A system and method for discharging a vehicle battery following a vehicle damaging event. The method includes determining that the vehicle has been involved in the vehicle damaging event and then discharging cells in the battery to a predetermined cell voltage based on the severity of the vehicle damaging event. The battery cells can be discharged by resistors that are already existing in the vehicle battery for cell balancing purposes, or by resistors that have been added for the cell discharge purposes. The voltage of the cells are monitored when they are being dissipated, and once the particular voltage of a cell has reached the desired voltage, then a switch is opened to disconnect the resistor from the cell.

17 Claims, 2 Drawing Sheets

AUTOMATIC CRASH BATTERY DISCHARGE METHOD

BACKGROUND OF THE INVENTION

1. Field of the Invention

This invention relates generally to a system and method for discharging a high voltage vehicle battery following a crash or other vehicle damaging event and, more particularly, to a system and method for discharging a lithium-ion vehicle battery following a crash or other vehicle damaging event that includes dissipating cell voltages in the battery using cell balancing resistors.

2. Discussion of the Related Art

Electric vehicles are becoming more and more prevalent. These vehicles include hybrid vehicles, such as the extended range electric vehicles (EREV), that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium-ion, nickel metal hydride, lead-acid, etc. A typical high voltage battery system for an electric vehicle may include several battery cells or modules to provide the vehicle power and energy requirements, where each battery module may include a certain number of battery cells, such as twelve cells. Different vehicle designs include different battery designs that employ various trade-offs and advantages for a particular application.

During a vehicle crash or other vehicle damaging event, the rearrangement and/or damage to various vehicle parts and the like may cause unwanted electrical connections and the discharge of various fluids from the vehicle to occur. Because of the electrical power that may be stored in the vehicle battery, these things could cause potentially hazardous situations, such as electrifying of vehicle parts, chemical hazards, fire hazards, etc.

Fault isolation detection systems are sometimes employed in electrical circuits to provide fault detection. Electric vehicles are one electrical system that typically employ fault isolation detection systems to prevent a person from being harmed by the system.

In order to provide electrical fault isolation, some vehicles are equipped with a battery disconnect unit (BDU) that automatically disconnects or removes battery power from the vehicle after a crash event by opening battery contactors. Also, it is known in the art to employ a manual service disconnect (MSD), which is a device that separates a battery into two parts, where a trained responder responding to a vehicle crash could remove the MSD to isolate the battery. However, these known isolation techniques do not remove the charge from the battery, only contain it.

As mentioned above, a high voltage battery for a vehicle typically includes several battery cells electrically coupled in series. As a result of many factors, such as internal cell resistance, electrical connections, battery aging, etc., the state-of-charge (SOC) of the cells in the battery may drift apart during operation of the battery over time. A battery management system may be provided to monitor the state-of-charge of each battery cell and the temperature of the battery, and control how much the battery can be charged and discharged based on the state-of-charge of the maximum charged cell and the minimum charged cell. The battery cannot be used to provide power if the cell with the lowest state-of-charge drops below some minimum state-of-charge because that cell may become damaged, and the battery cannot be over-charged beyond some maximum state-of-charge for the cell with the highest state-of-charge because that cell may become overheated and damaged. Thus, a cell with a low state-of-charge may prevent the battery from being used even though the other cells may have a suitable or significant state-of-charge.

It is known in the art to provide a cell balancing system that attempts to control the charging and discharging of the cells within a high voltage vehicle battery so that they have about the same level charge at any given point in time. In one known cell balancing circuit, cell balancing resistors are provided in parallel with the battery cells that allow the cells to be electrically dissipated to a desired level so that the charge matches other battery cells.

SUMMARY OF THE INVENTION

In accordance with the teachings of the present invention, a system and method are disclosed for discharging a vehicle battery following a vehicle damaging event. The method includes determining that the vehicle has been involved in the vehicle damaging event and then discharging cells in the battery to a predetermined cell voltage based on the severity of the event. The battery cells can be discharged by resistors that are already existing in the vehicle battery for cell balancing purposes, or by resistors that have been added for the cell discharge purposes. The voltage of the cells are monitored when they are being dissipated, and once the particular voltage of a cell has reached the desired voltage, then a switch is opened to disconnect the resistor from the cell. Alternately, the cell voltages are not monitored, but are passively discharged to zero volts. In one embodiment, the predetermined cell voltage is three separate voltages depending on event severity, including a minimum operating voltage of the cells for a low severity event, a 0% SOC of the cells for a medium severity event and a zero voltage of the cells for a severe event.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for discharging battery cells in a high voltage vehicle battery following a crash or other vehicle damaging event is merely exemplary in nature, and is in no way intended to limit the invention or its applications or uses. For example, the technique of the present invention has particular application for dissipating charge from a high-voltage vehicle battery, and in particular a lithium-ion vehicle battery. However, as will be appreciated by those skilled in the art, the technique of the invention may have application for other systems other than vehicle systems.

Figure 1:
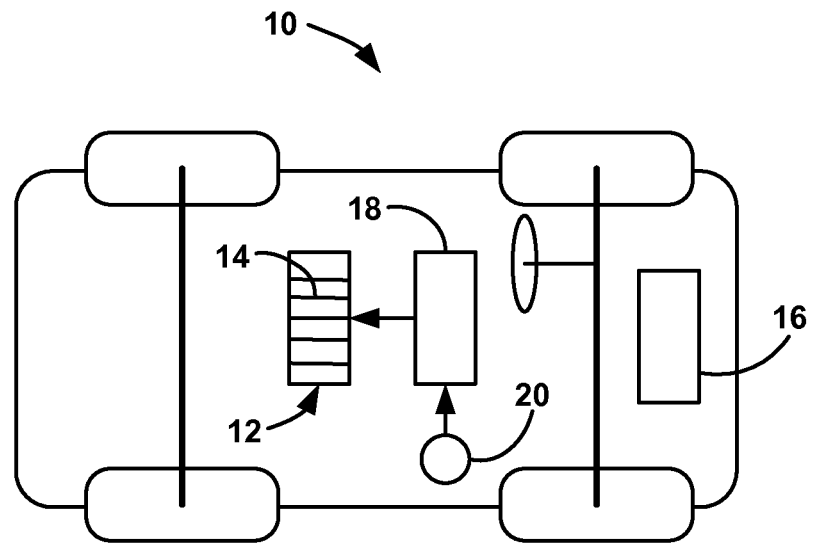
FIG. 1 is a simple illustration of a vehicle including a high voltage battery.

FIG. 1 is a simple illustration of a vehicle 10 intended to represent any electric vehicle or electric hybrid vehicle. The vehicle 10 includes a high voltage battery 12 mounted to a suitable support within the vehicle 10, where the battery 12 includes a plurality of battery cells 14. The battery 12 can be any battery suitable for an electric vehicle, such as a lead-acid battery, lithium-ion battery, nickel metal hydride battery, etc. The vehicle 10 may also include a separate power source 16, such as an internal combustion engine, fuel cell system, etc., for an electric hybrid vehicle. The vehicle 10 includes an electronic control unit (ECU) 18 that controls various aspects of the operation of the vehicle 10. In the embodiment discussed below, the ECU 18 receives signals from one or more sensors 20 indicating that a crash or other vehicle damaging event, such as a fire, has occurred, and possibly the severity of the event, where the sensor 20 can be part of any suitable crash detection system, such as an airbag deployment system, accelerometer, temperature detection system, etc.

Figure 2:
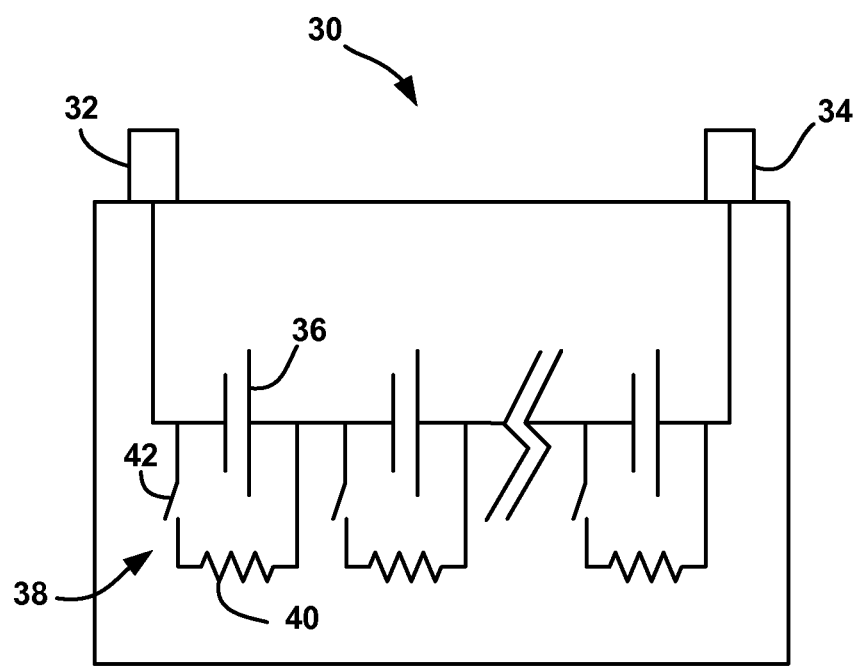
FIG. 2 is a schematic diagram of a high voltage battery including balancing resistors.

FIG. 2 is schematic diagram of a high voltage energy storage system, such as a battery 30, for example, a lithium-ion battery, that can be used as the high voltage battery 12 on the vehicle 10. The battery 30 includes a negative terminal 32 and a positive terminal 34. The battery 30 also includes a plurality of battery cells 36 electrically coupled in series between the terminals 32 and 34 that store electrical charge in a manner that is well understood by those skilled in the art. In one non-limiting example, each cell 36 may operate with a cell voltage in the range of 3 to 4.15 volts suitable for operation of the vehicle 10, where 2-3 volts is considered 0% SOC of the cell 36 and a cell voltage less than 2 volts is an over-discharge of the cell 36.

As mentioned above, it is desirable to provide cell voltage balancing in a vehicle battery so that each of the cells 36 discharge and charge to about the same level. In order to accomplish this, each cell 36 includes a cell balancing circuit 38 electrically coupled in parallel with the particular cell 36. In this example, the cell balancing circuit 38 includes a switch 42, typically a solid-state switch, such as a MOSFET, electrically coupled in series with a suitably sized resistor 40. A cell-balancing control algorithm is provided to control the switch 42 during charging and discharging of the battery 30 so that the charge on the battery cell 36 is either dissipated or not dissipated by the resistor 40 to cause the charge on each cell 36 to be substantially the same. This will prevent some of the cells 36 from over-charging or over-discharging compared to the other cells 36.

The present invention proposes using the already existing resistors 40 provided for cell voltage balancing as discussed above to dissipate the charge on the battery cells 36 to a desired level following a crash or vehicle damaging event. As mentioned, the balancing circuit 38 including the resistors 40 can already be an existing part of the battery 30. Alternately, the resistors 40 can be added to the battery 30 for the purposes discussed herein.

The ECU 18 can employ logic and suitable algorithms to provide varying levels of discharge of the cells 36 through the resistors 40 depending on the severity of the event. For example, in a high severity collision, as possibly determined by the rate-of-change of vehicle velocity or other crash-related parameters, the battery 30 can be discharged to about zero volts since it is likely that the battery 30 will be damaged by the collision and will not be able to be used thereafter.

For a less severe collision or crash event, the battery 30 may be discharged to a 0% state-of-charge below the normal operating state-of-charge of the battery 30, since it is likely that the battery 30 will not be damaged by the event and may still be able to be used. For example, the battery cells 36 may be discharged to a level slightly less than 3 volts in the example given above, where the battery 30 will have to be charged at a service location to be able to be used again.

In a third option where the collision is minor and the battery discharge may just be a precaution, the ECU 18 may cause the battery cells 36 in the battery 30 to be discharged to the lower end of the cell operating range, which could be about 3.3 volts in a non-limiting example for a specific system.

Other parameters can be used to determine the level of cell voltage discharge. For example, a loss of 12 volt power to the battery 30 when combined with collision severity information may be used to determine the appropriate voltage discharge level to discharge the battery cells 36. In addition, if in the future, a battery state-of-charge health metric is available, this parameter can also be used to determine the appropriate amount of discharge of the battery 30. Also, cell temperature can be a parameter that can be used to determine the level of cell discharge, where the vehicle 10 may be in a fire.

An additional potential application is to implement a function that initiates discharge of the battery cells 36 upon removal of the 12 volt power from the battery 30. In this case, to prevent battery damage and customer dissatisfaction, the level of discharge would need to be no more than the lower end of the normal voltage operating range of the battery 30. This would allow the battery 30 to be reinstalled or reconnected to the vehicle 10 without adversely affecting performance. However, it would be necessary to make sure that a battery in long term storage, for example, has a lower state-of-charge.

Figure 3:
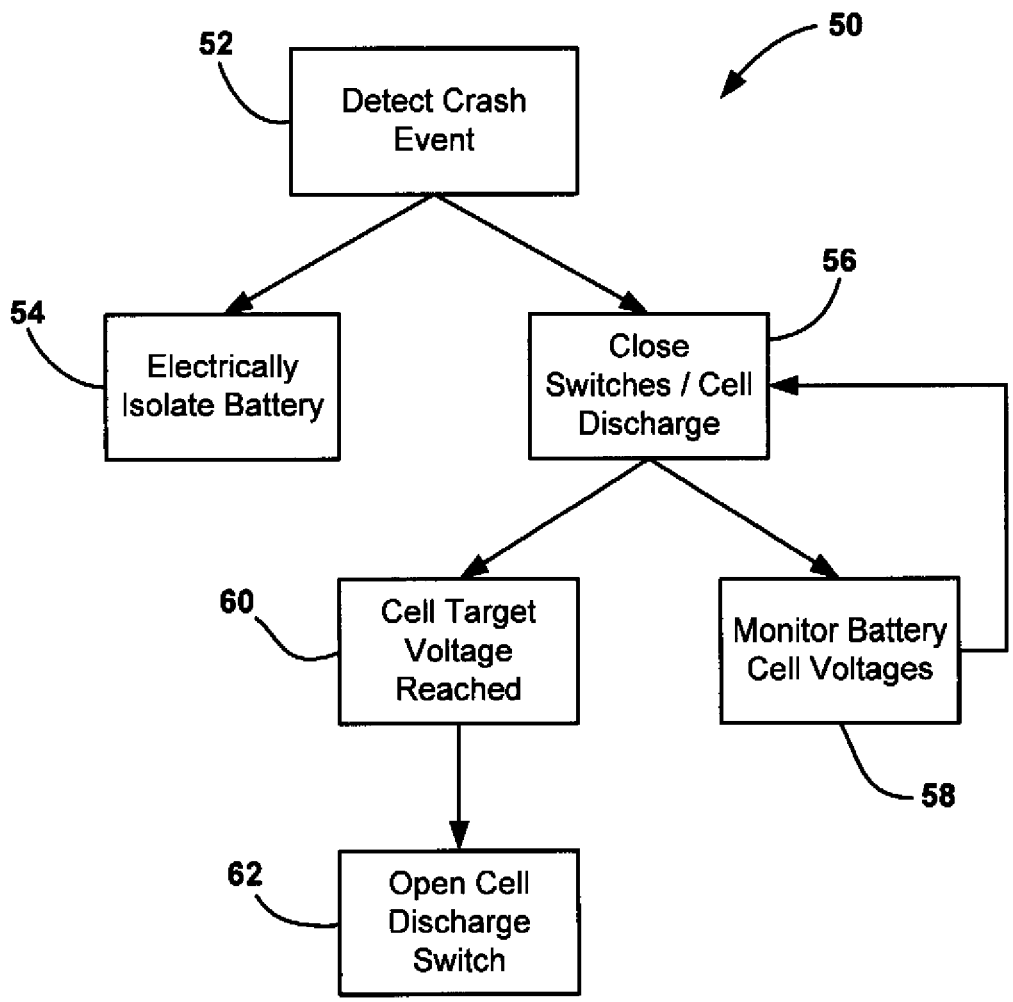
FIG. 3 is a flow chart diagram showing an operation for dissipating the electrical charge of battery cells in a vehicle battery.

FIG. 3 is a flow chart diagram 50 showing an operation for dissipating the battery cells 36 to a certain state-of-charge level in response to a vehicle crash or other vehicle damaging event, depending on severity. At box 52, the algorithm detects the crash or collision event through any suitable crash sensor or combination of crash sensors to determine that the crash or collision event has occurred. The sensors, or other devices, also determine the level of severity of the crash event and select a cell voltage dissipation level based on that severity. As discussed above, these dissipation levels can be a minimum cell operation voltage where the battery 30 is still operational, a 0% state-of-charge level where the cell voltage is just below the operating range of the cells 36, but where the cells can be recharged, and a 0 volt level where the cells will become damaged and not be able to be reused. Other dissipation levels may be desirable for other applications. The crash sensors can include airbag deployment sensors, accelerometers, etc. on the vehicle 10.

Upon detection of the event, the algorithm performs the normal battery isolation process at box 54, such as opening a BDU. Further, the algorithm also closes all of the switches 42 to discharge the battery cells 36 through the resistors 40 at box 56. The algorithm monitors the voltage level of each of the individual cells 36 in the battery 30 at box 58 so that if the voltage of a particular cell 36 is greater than the predetermined voltage dissipation level based on the event, the algorithm will maintain the switch 42 in the closed position at the box 56. Once a particular cell 36 reaches the predetermined voltage dissipation level at box 60, the algorithm opens the switch 42 for that particular cell 36 at box 62. Thus, even though the cells 36 should be somewhat balanced at any point in time, the present invention still allows unbalanced cells to be discharged separately by using the separate resistor 40 for each cell 36.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for discharging a battery on a vehicle, said battery including a plurality of battery cells, each battery cell including a discharge circuit, said method comprising:
    determining that the vehicle has been involved in a vehicle damaging event; and
    discharging each battery cell if a vehicle damaging event is detected by turning on the discharge circuit for each cell to discharge the cell to a predetermined cell state-of-charge level, where discharging the battery cells includes discharging the battery cells to a first state-of-charge level if the vehicle damaging event is determined to be low severity where the battery cells retain charge to operate the vehicle, discharging the battery cells to a second state-of-charge level if the vehicle damaging event is determined to be medium severity where the battery cells can be recharged, and discharging the battery cells to a third state-of-charge level if the vehicle damaging event is determined to be high severity where the battery cells are damaged and cannot be recharged.

2. The method according to claim 1 wherein discharging each battery cell includes monitoring a voltage of each battery cell and separately stopping the discharge of each battery cell when it reaches the predetermined cell state-of-charge level.

3. The method according to claim 1 wherein the first state-of-charge level is about 3.3 volts, the second state-of-charge level is 0% state-of-charge and the third state-of-charge level is 0 volts.

4. The method according to claim 1 wherein discharging each battery cell includes discharging each battery cell by a separate resistor.

5. The method according to claim 4 wherein the resistors for each cell are part of a cell balancing circuit.

6. The method according to claim 1 wherein the vehicle damaging event includes a crash event or a high temperature event.

7. The method according to claim 1 wherein determining that the vehicle has been involved in a vehicle damaging event includes detecting the vehicle damaging event using crash detectors.

8. The method according to claim 1 wherein determining that the vehicle has been involved in a vehicle damaging event includes monitoring an airbag deployment system.

9. The method according to claim 1 wherein the battery is a lithium ion battery.

10. A method for discharging a battery on a vehicle, said battery including a plurality of battery cells, each battery cell including a discharge circuit, said method comprising:
    determining that the vehicle has been involved in a vehicle damaging event;
    determining a severity of the crash event if the vehicle has been involved in the vehicle damaging event; and
    discharging each battery cell to a different resistor if a crash vehicle damaging is detected by turning on the discharge circuit for each cell to discharge the cell to a predetermined cell state-of-charge level, wherein discharging the battery cells includes discharging the battery cells to a first state-of-charge level if the vehicle damaging event is determined to be low severity where the battery cells retain charge to operate the vehicle, discharging the battery cells to a second state-of-charge level if the vehicle damaging event is determined to be medium severity where the battery cells can be recharged, and discharging the battery cells to a third state-of-charge level if the vehicle damaging event is determined to be high severity where the battery cells are damaged and cannot be recharged, and wherein discharging each battery cell includes monitoring a voltage of each battery cell and separately stopping the discharge of a battery cell when it reaches the predetermined cell state-of-charge level.

11. The method according to claim 10 wherein the first state-of-charge level is about 3.3 volts, the second state-of-charge level is 0% state-of-charge and the third state-of-charge level is 0 volts.

12. The method according to claim 10 wherein the means for discharging discharges each battery cell by a separate resistor where the resistors for each cell are part of a cell balancing circuit.

13. The method according to claim 10 wherein the vehicle damaging event includes a crash event or a high temperature event.

14. A system for discharging a battery on a vehicle, said battery including a plurality of battery cells, each battery cell including a discharge circuit, said system comprising:
    means for determining that the vehicle has been involved in a vehicle damaging event; and
    means for discharging each battery cell if a vehicle damaging event is detected by turning on the discharge circuit for each cell to discharge the cell to a predetermined cell state-of-charge level, where the means for discharging the battery cells discharges the battery cells to a first state-of-charge level if the vehicle damaging event is determined to be low severity where the battery cells retain charge to operate the vehicle, discharging the battery cells to a second state-of-charge level if the vehicle damaging event is determined to be medium severity where the battery cells can be recharged, and discharging the battery cells to a third state-of-charge level if the vehicle damaging event is determined to be high severity where the battery cells are damaged and cannot be recharged.

15. The system according to claim 14 wherein the means for discharging each battery cell monitors a voltage of each battery cell and separately stopping the discharge of a battery cell when it reaches the predetermined cell state-of-charge level.

16. The system according to claim 14 wherein the resistors are part of a cell balancing circuit.

17. The system according to claim 14 wherein the vehicle damaging event includes a crash event or a high temperature event.

* * * * *